(12) United States Patent
Liu et al.

(10) Patent No.: US 7,767,189 B2
(45) Date of Patent: Aug. 3, 2010

(54) METHODS FOR PREPARATION FROM CARBONATE PRECURSORS THE COMPOUNDS OF LITHIUM TRANSITION METALS OXIDE

(75) Inventors: Huiquan Liu, Shenzhen (CN); Chuanfu Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 456 days.

(21) Appl. No.: 10/717,236

(22) Filed: Nov. 19, 2003

(65) Prior Publication Data
US 2005/0053545 A1 Mar. 10, 2005

(30) Foreign Application Priority Data
Nov. 19, 2002 (CN) ................. 02 1 51991

(51) Int. Cl.
*C01D 15/00* (2006.01)
*C01D 15/02* (2006.01)
*C01G 1/00* (2006.01)
*C01G 1/02* (2006.01)
*C01G 45/00* (2006.01)
*C01G 51/00* (2006.01)
*C01G 53/00* (2006.01)

(52) U.S. Cl. .............. 423/593.1; 423/594.4; 423/594.6; 423/599; 423/641; 423/138; 423/49; 423/179.5

(58) Field of Classification Search ............... 423/593.1, 423/594.4, 594.6, 599, 641, 138, 49, 179.5
See application file for complete search history.

(56) References Cited

U.S. PATENT DOCUMENTS

| 5,160,712 | A | * | 11/1992 | Thackeray et al. | .......... 423/138 |
| 5,631,104 | A | * | 5/1997 | Zhong et al. | ................ 429/224 |
| 5,783,333 | A | * | 7/1998 | Mayer | ......................... 429/223 |
| 6,660,432 | B2 | * | 12/2003 | Paulsen et al. | .......... 429/231.3 |
| 2004/0179993 | A1 | * | 9/2004 | Dahn et al. | ............. 423/594.4 |
| 2004/0223906 | A1 | * | 11/2004 | Wang et al. | .............. 423/594.4 |

\* cited by examiner

*Primary Examiner*—Timothy C Vanoy
(74) *Attorney, Agent, or Firm*—Venture Pacific Law, PC

(57) ABSTRACT

A method for preparing lithium transitional metal oxides, comprises the steps of: preparing a carbonate precursor using the following substeps: forming a first aqueous solution containing a mixture of at least two of the ions of the following metal elements ("$Me^{n+}$"): cobalt (Co), nickel (Ni), and manganese (Mn); forming a second aqueous solution containing ions of $CO_3^{2-}$; and mixing and reacting the first solution and the second solution to produce the carbonate precursor, $Ni_{1-x-y}Co_xMn_yCO_3$; and preparing the lithium transition metals oxide from the carbonate precursors using the following substeps: evenly mixing $Li_2CO_3$ and the carbonate precursor; calcinating the mixed material in high temperature; and cooling and pulverizing the calcinated material to obtain the lithium transition metal oxide, $Li\ Ni_{1-x-y}Co_xMn_yO_2$.

20 Claims, 2 Drawing Sheets

METHODS FOR PREPARATION FROM CARBONATE PRECURSORS THE COMPOUNDS OF LITHIUM TRANSITION METALS OXIDE

CROSS REFERENCE

This application claims priority to a Chinese patent application entitled "Methods for Preparation from Carbonate Precursors the Compounds of Lithium Transition Metals Oxide" filed on Nov. 19, 2002, having a Chinese Patent Application No. 02151991.9.

FIELD OF INVENTION

This invention relates to methods for preparing compounds of lithium transitional metal oxide. In particular, it relates to methods for preparing carbonate precursors and, from the carbonate precursors, compounds of lithium transitional metal oxide that has excellent electrochemical properties.

BACKGROUND

Known commercialized lithium ion batteries use several types of transition metal oxide compounds such as lithium cobalt dioxide ($LiCoO_2$), lithium nickel dioxide ($LiNiO_2$), and lithium manganese dioxide ($LiMn_2O_4$) etc. as the material for the positive electrode. $LiCoO_2$ is the most commonly used material. Although the overall properties of $LiCoO_2$ are the best, its cost is high and, due to its scarcity, the cost is likely to rise even higher. Its supply could even dry up. Therefore, many countries are researching the use of at least two of the following transition metals: Cobalt (Co), Nickel (Ni), and Manganese (Mn) as the basic ingredient for compounds of lithium transition metal oxide to be used for electrodes in batteries. Representative relevant work includes: Reference 1: Zhaolin Lin et al. in J. Power Sources, 88-82 (1999) 416-419 which discloses the synthesizing method for the lithium transition oxide compound, $Li\ Ni_{1-x-y}Co_xMn_yO_2$; and Reference 2: Chinese Patent No. CN1271185A, Oct. 25, 2000, which discloses a method of preparation for an additive ingredient, $LiCoO_2$, $LiNiO_2$, and $LiMn_2O_4$.

The inventors of this invention found that, when compared with oxidized compounds prepared by thermally decomposing the mixture made by combining the salts or hydroxide compounds of transition metal elements such as cobalt, nickel, and manganese and with salt of lithium, the compounds prepared by the method described by Zhaolin, Lin, et al. in reference 1 have better distribution of grain diameter, density, and electrochemical capacity. However, in order to have said excellent properties, the range of the distribution of the diameter for the spherical intermediate products formed using method reported by Zhaolin, Lin, et al in reference 1, $Ni_{1-x-y}Co_xMn_y(OH)_2$, has to be narrow. This can only occur by strictly controlling the precipitation conditions which is difficult to accomplish in practice. The method described in Chinese Patent No. CN1271185A (reference 2) spray mixes soluble salts, carbonates, or alkaline solutions of lithium and transition metals such as of cobalt, nickel, or manganese, and alkaline carbonates to obtain a crystal compound; then decompose thermally to obtain $LiCoO_2$, $LiNiO_2$, and $LiMn_2O_4$ as the additive ingredient. However, this method is not easy to implement as the $Li_2CO_3$ produced has a large solubility, and some of it is dissolved and removed during the rinsing process to remove the negative ions. This decreases the lithium content of the final product and results in the inability to obtain the amount calculated from the formulas of $LiCoO_2$, $LiNiO_2$, and $LiMn_2O_4$.

Due to the limitation of the prior art, it is therefore desirable to have novel and innovative methods for the preparation of compounds of lithium transitional metal oxide.

SUMMARY OF THE INVENTION

A method for preparation from carbonate precursors the compounds of lithium and transition metal oxides that includes first, the preparation of the carbonate precursors and then the preparation of the compounds of lithium transition metals oxide from the carbonate precursors.

The preparation of the carbonate precursors from transition metals nickel, cobalt, and manganese include the following steps: (1) Formulate a solution which combines a solution that contains a mixture of ions of cobalt, nickel, and manganese with another solution that contains $CO_3^{2-}$ ions; (2) Combine the two solutions together to react and form the carbonate precursor, $Ni_{1-x-y}Co_xMn_yCO_3$.

The preparation of the compounds of lithium transition metal compound with transitional metal nickel, cobalt, and manganese include the following steps: (1) Mix $Li_2CO_3$ with the $Ni_{1-x-y}Co_xMn_yCO_3$ precursor uniformly, calcine the mixture in air at 500-800° C. for 2 to 20 hours; (2) Cool and pulverize said calcined material; (3) Calcine again said pulverized calcined material in air at 700 to 950° C. for 2 to 30 hours; and (4) Cool, ballmill, and sift to obtain the compound of lithium transition metal oxide, $LiNi_{1-x-y}Co_xMn_yO_2$.

The $LiNi_{0.4}Co_{0.2}Mn_{0.4}CO_3$ that is prepared by the method of this invention has a narrow range of grain size distribution where the average grain size is 10 μm. A battery with an electrode made from this compound has a long cycle life and its electrical capacity reaching 150 mAh/g, long cycle life making it suitable of use in lithium ion batteries.

DETAILED DESCRIPTION OF THE PRESENT INVENTION

Figure 1:
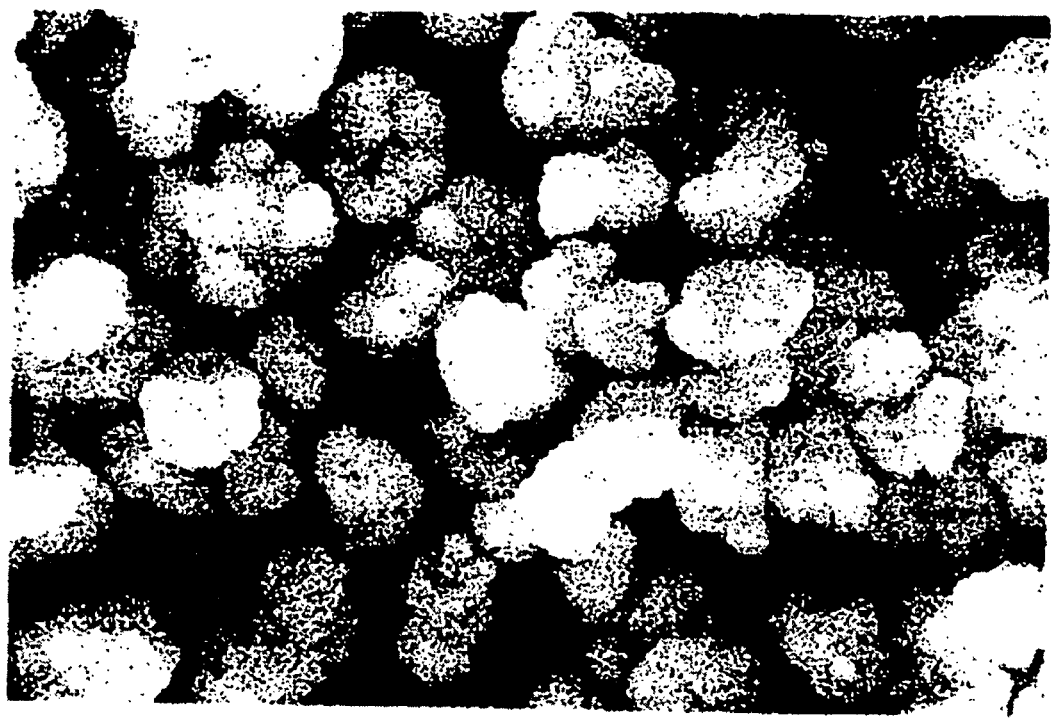
FIG. 1 illustrates a photograph at 1000× magnification of an example of the $Ni_{1-x-y}Co_xMn_yCO_3$ precursor made from using a method of the present invention.
Figure 2:
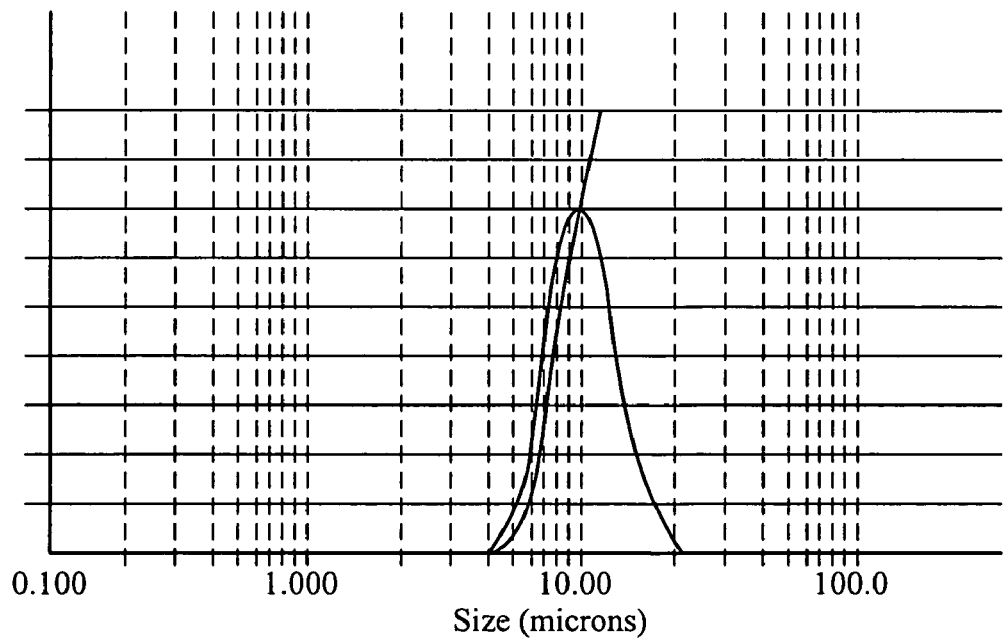
FIG. 2 is an example of the grain size distribution of the $Ni_{1-x-y}Co_xMn_yCO_3$ precursor made from using a method of the present invention.

One of the objectives of this invention is to eliminate the defects in prior art methods, and to provide a method for preparing a compound from the carbonate precursors of lithium transitional metal oxide with excellent electrochemical properties. If nickel, cobalt, and manganese are used as the transition metals, then the carbonate precursor is $Ni_{1-x-y}Co_xMn_yCO_3$ or its hydroxide carbonate compound. The final product $LiNi_{1-x-y}Co_xMn_yO_2$ is formed after the precursor is thermally decomposed with a lithium salt.

If nickel, cobalt, and manganese are chosen as the transition metals, one of the characteristics of this invention, a method to prepare from carbonate precursors the compounds of lithium transition metals oxide, include the following steps:

(1) Preparation of Carbonate Precursor a. Formulate a solution with an aqueous solution (hereinafter referred to as "solution A") containing a mixture of at least two of the ions of the following metal elements (hereinafter "$Me^{n+}$"): Cobalt (Co), Nickel (Ni), and manganese (Mn); and an aqueous solution containing ions of $CO_3^{2-}$ (hereinafter "solution B");

b. Mix, stir, and react solution A and solution B for several hours to obtain the $Ni_{1-x-y}Co_xMn_yCO_3$ precursor (including its hydroxide carbonate compound);

The specifications for reactions are: PH: 5 to 10, reaction temperature: 30 to 90° C., stirring speed: 20 to 120 revolutions, per minute, and reaction time: 2 to 30 hours;

(2) Formation of Compound of Lithium Transition Metal Oxide a. Mix said $Li_2CO_3$ and said $Ni_{1-x-y}Co_xMn_yCO_3$ evenly. Then calcine in air at 500 to 800° C. for 2 to 20 hours;

b. Cool and pulverize of said material that has been calcined;

c. Again calcine said pulverized calcined material in air at 700 to 950° C. for 2 to 30 hours; and d. Cool, ballmill, and sift to obtain the compound of lithium transition metal oxide $Li\ Ni_{1-x-y}Co_xMn_yO_2$.

In step (1), the preferred ion concentration of solution A is 0.1 to 3.0 mol/l. $Me^{n+}$ derives from at least one of the compounds from the following groups of materials: sulfates, nitrates, chlorides, acetates, other water soluble inorganic salts, and, other water soluble salts of organic acid.

In step (1), a further preference is for solution A to contain at least one type of additive ingredient from the group containing the ions of the following elements: Ca, Mg, Zn, Y, Ga, and In. The molar concentration of the additive component consists of 0 to 10% of the basic ingredients.

In step (1), the preferred $Co_3^{2-}$ ion concentration of solution B is 0.1 to 3.0 mol/l. The $Co_3^{2-}$ derives from at least one of the compounds from the following group of materials: $Na_2CO_3$, $K_2CO_3$, $(NH_4)_2CO_3$, other aqueous solution of carbonates, and other compatible water soluble salt containing $HCO_3^-$.

In step (1), the preferred PH level is adjusted by 1.0-6.0 mol/l of at least one aqueous solution (hereinafter "solution") from the following groups: NaOH, KOH, and $NH_3$, and other alkaline aqueous solutions. Solutions A, B, and C are combined in a reactor which is continuously stirred.

In step (1), a further preference is for solution A to be a combination of the solutions of the salts of cobalt, nickel, and manganese; solution B is a $Na_2CO_3$ solution; and solution C is a NaOH solution. The rate of flow is adjusted for the reaction to proceed at PH between 8 to 9 and the temperature between 30-90° C.

A further preference for step (1) is for solution A to be an aqueous solution of the combination of the sulfates salts of cobalt, nickel, and manganese; solution B to be $(NH_4)_2CO_3$; and solution C be $NH_3.H_2O$ solution. The rate of flow is adjusted for the reaction to proceed at the PH level between 8 to 9 and the temperature between 30 to 90° C.

A preference for step (2) is to first dry mix the $Li_2CO_3$ with said $Ni_{1-x-y}Co_xMn_yCO_3$, then wet mix with water or an organic solvent such as ethanol. The mixture is fully stirred and uniformly mixed. For step (2)a, calcine instead at 550 to 700° C., for 6 to 10 hours. For step (2)c, calcine instead at 750 to 900° C. for 10 to 25 hours.

This invention is a method for preparing compounds of lithium transitional metal oxide through the formation of the transition metal carbonate precursor. The preparation method described above is for a particular embodiment using nickel cobalt and manganese as the transition metal. If other transition metals are chosen instead of the three above, this above described embodiment can be tailored by using the appropriate initial ingredients and customizing the reaction specifications.

Implementation Details

If nickel, colbalt, and manganese are used as the transition metal, the following, together with the attached figures explains the methods of this invention in detail.

To form the precursor chemical $Ni0_{0.4}Co_{0.2}Mn_{0.4}CO_3$, combine 1.0 mol/l of an aqueous solution of sulfate solution of a combination of cobalt, nickel, and manganese, 1.00 mol/l of aqueous solution of NaOH, and 1.0 mol/l of aqueous solution of $NA_2CO_3$ and add into reactor. The reaction temperature is kept at 45° C., and the PH level is kept between 8.5 to 9. The mixture is stirred at 40 revolutions per minute for the 10 hours of reaction time. The $Ni0_{0.4}Co_{0.2}Mn_{0.4}CO_3$ precursor is obtained after filtering, washing, and drying. The scanning electron micrograph in FIG. (1) shows that this precursor is not spherically shaped, of even size and distributed and not clustered. FIG. (2) shows that the range of grain size distribution is narrow with average grain size as 10 μm.

To form the compound of lithium transition metal oxide, $LiNi0_{0.4}Co_{0.2}Mn_{0.4}O_2$, a pre-determined amount of $Ni0_{0.4}Co_{0.2}Mn_{0.4}CO_3$ precursor and $Li_2CO_3$ are added in. The dry materials are first mixed together, then water is added and the mixture is fully stirred to combine the ingredients uniformly before transferring to the reactor. The mixture is calcined at 550° for 6 hours. It is then cooled and pulverized. The material is then again calcined at 850° C. for 20 hours, then cooled, and ballmill to make $LiNi0_{0.4}Co_{0.2}Mn_{0.4}O_2$. In the resulting product, the range of the distribution of grain size is narrow where the average grain size is 10 μm.

Figure 3:
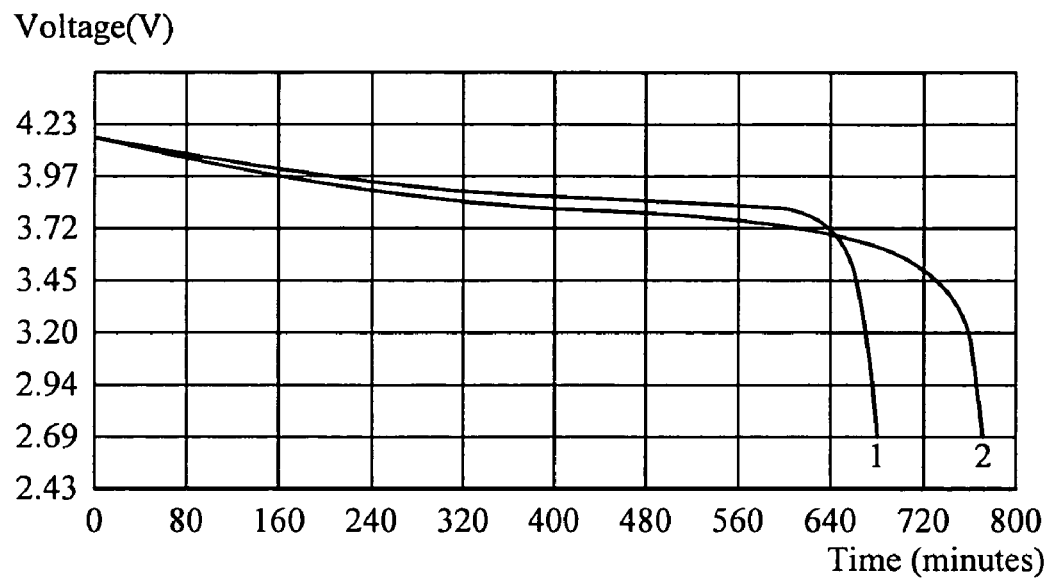
FIG. 3 shows the electrical discharge curves of a lithium ion battery made with $Li\ NiO_{0.4}Co_{0.2}Mn_{0.4}O_2$ by using a method of the present invention.
Figure 4:
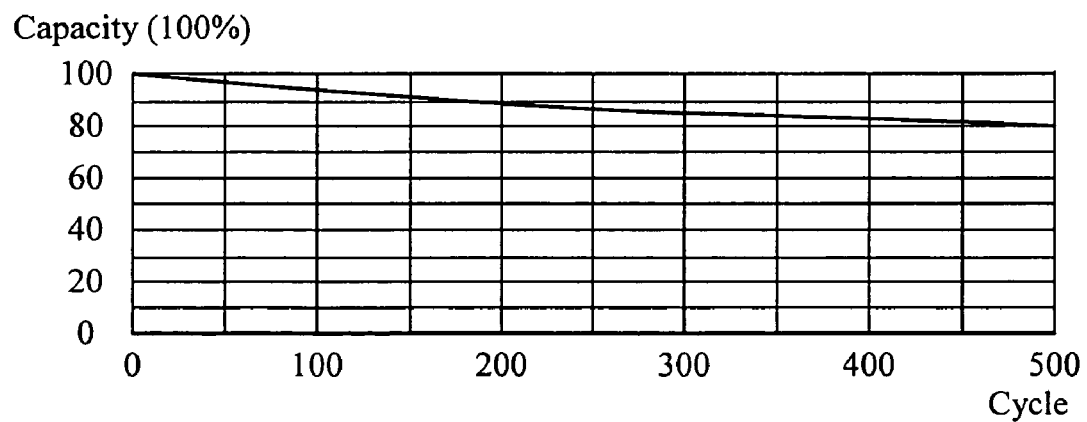
FIG. 4 is a curve of the cycle characteristics of a lithium ion battery made with $LiNiO_{0.4}Co_{0.2}Mn_{0.4}O_2$ by an example of an embodiment of the present invention.

A customary method is used to make a lithium ion battery with said $LiNi0_{0.4}Co_{0.2}Mn_{0.4}O_2$. The electrical properties of that battery are then compared with a battery made from $Li_2CoO_2$. In FIG. 3, Curve 2 and Curve 1 shows the discharge characteristics of an example of a battery made from an embodiment of this invention and a $Li_2CoO_2$ battery, respectively. The graphs show that the discharge capacity of the battery made from the compound of lithium transition metal oxide prepared from an embodiment of this invention is high, reaching to 720 minutes. The electrical capacity is calculated to be 150 mAh/g. Also, the midpoint voltage of the discharge platform is near that of the $Li_2CoO_2$ battery. Its cycling life also reaches 500 times. Since the amount of cobalt used is low but the properties of the battery is not reduced, the compounds of lithium transition metals oxide from carbonate precursors made from this invention is new, innovative, has distinctive characteristics, and has widespread application.

When compared with existing methods, this invention has the following advantages:

1. The final product obtained by using this invention has a stable chemical composition and structure. Using the materials as stated, the $Ni_{1-x-y}Co_xMn_yCO_3$ precursor or the hydroxide compounds of carbonates is formed, which, when decompose thermally with $Li_2O_3$ can produce said oxidized compound, $Li\ Ni_{1-x-y}Co_xMn_yO_2$. This is possibly due to the fact that lithium is fully mobile and nickel, cobalt, and manganese can be rearranged.

2. The technology is easy to control. Inlike the method used by Zhaolin, Lin, et al in reference 1, it does not require the strict control of reaction conditions. In Zhaolin, Lin et al., the intermediate bi-products, the hydroxides of compounds of nickel, cobalt and manganese, have to be spherically shaped in order for the final product to have good electrochemical properties. The controlling of conditions to achieve this result is difficult in practice.

3. Strictly speaking, under alkaline conditions, the precursor product is the hydroxide salt of $Ni_{1-x-y}Co_xMn_yCO_3$. When this product decomposes at high temperature, since its outward appearance is not spherical, and carbonates and hydroxide chemicals have different decomposition characteristics, the decomposition matter has crystalline defects and a large number of minute internal holes. Therefore its excellent qualities include: a comparatively larger volume, a long useable lifespan, and a narrow range for the distribution of grain diameter.

While the present invention has been described with reference to certain preferred embodiments, it is to be understood that the present invention is not to be limited to such specific embodiments. Rather, it is the inventor's contention that the invention be understood and construed in its broadest meaning as reflected by the following claims. Thus, these claims are to be understood as incorporating and not only the preferred embodiment described herein but all those other and further alterations and modifications as would be apparent to those of ordinary skilled in the art.

We claim:

1. A method for preparing lithium transitional metal oxides, comprising the steps of:
   preparing a carbonate precursor using the following substeps:
      forming a first aqueous solution containing a mixture of at least two of the ions of the following metal elements ("$Me^{n+}$"): cobalt (Co), nickel (Ni), and manganese (Mn);
      forming a second aqueous solution containing ions of $CO_3^{2-}$; and
      mixing and reacting said first solution and said second solution to produce the carbonate precursor, $Ni_{1-x-y}Co_xMn_yCO_3$; and
   preparing said lithium transition metals oxide from said carbonate precursors using the following substeps:
      evenly mixing $Li_2CO_3$ and said carbonate precursor;
      calcinating the mixed material in high temperature; and
      cooling and pulverizing the calcinated material to obtain said lithium transition metal oxide, $LiNi_{1-x-y}Co_xMn_yO_2$.

2. The method of claim 1 wherein the calcinating step is performed in air.

3. The method of claim 1 further comprising a step after the cooling step, again calcinating said cooled and pulverized material in air at high temperature.

4. The method of claim 3 further comprising a step after the again calcinating step, cooling, ballmilling, and sifting the again calcinated material to obtain the compound of lithium transition metal oxide, LiNi1-x-yCoxMnyO2.

5. The method of claim 1 wherein the mixing and reacting substep is performed under the condition where the PH is between 5 to 10.

6. The method of claim 1 wherein the mixing and reacting substep is performed under the condition where the reaction temperature is between 30 degrees to 90 degrees Celsius.

7. The method of claim 1 wherein the mixing and reacting substep is performed under the condition where the stirring speed is between 20 to 120 revolutions per minute.

8. The method of claim 1 wherein the mixing $Li_2CO_3$ substep is performed under the condition where the calcination is at 500 to 800° C.

9. The method of claim 3 wherein the again calcinating step is performed under the condition where the calcination is at 700 to 950° C.

10. The method of claim 1 wherein the ion concentration of the first solution is 0.1 to 3.0 mol/l.

11. The method of claim 10 wherein the $Me^{n+}$ derives from at least one of the compounds from the following groups of materials: sulfates, nitrates, chlorides, acetates, other water soluble inorganic salts, and, other water soluble salts of organic acid.

12. The method of claim 1 wherein the first solution contains at least one type of additive ingredient from the group containing the ions of the following elements: Ca, Mg, Zn, Y, Ga, and In.

13. The method of claim 12 wherein the molar concentration of the additive ingredient is of 0 to 10% of the overall solution.

14. The method of claim 1 wherein the $CO_3^{2-}$ ion concentration of the second solution is 0.1 to 3.0 mol/l.

15. The method of claim 1 further including a third solution in the preparation of the carbonate precursor wherein the third solution is a NaOH solution; and
   wherein the condition for preparing said carbonate precursor is where the flow rate is adjusted for the reaction to proceed at PH between 8 to 9 and the temperature is between 30-90° C.

16. The method of claim 1 wherein said first solution is an aqueous solution of the combination of the sulfates salts of cobalt, nickel, and manganese; and said second solution is $(NH_4)_2CO_3$; and further including a third solution that is a $NH_3.H_2O$ solution in the preparation of said carbonate precursor where the flow rate is adjusted for the reaction to proceed at the PH level between 8 to 9 and the temperature is between 30 to 90° C.

17. The method of claim 1 wherein the mixing the $Li_2CO_3$ step is to first wet mixing with an organic solvent such as ethanol.

18. A method for preparing lithium transitional metal oxides, comprising the steps of:
   preparing a carbonate precursor using the following substeps:
      forming a first aqueous solution containing a mixture of at least two of the ions of the following metal elements ("$Me^{n+}$"): cobalt (Co), nickel (Ni), and manganese (Mn), wherein the ion concentration of the first solution is 0.1 to 3.0 mol/l; wherein the first solution contains at least one type of additive ingredient from the group containing the ions of the following elements: Ca, Mg, Zn, Y, Ga, and In; and wherein the molar concentration of the additive ingredient is of 0 to 10% of the overall solution;
      forming a second aqueous solution containing ions of $CO_3^{2-}$; and
      mixing and reacting said first solution and said second solution to produce the carbonate precursor, $Ni_{1-x-y}Co_xMn_yCO_3$, under the conditions where the PH is between 5 to 10, the reaction temperature is between 30 degrees to 90 degrees Celsius, and the stirring speed is between 20 to 120 revolutions per minute; and preparing said lithium transition metals oxide from said carbonate precursors using the following substeps:
evenly mixing $Li_2CO_3$ and said carbonate precursor;
calcinating the mixed material in air in high temperature of 500 to 800° C.; and
cooling and pulverizing the calcinated material;
again calcinating said cooled and pulverized material in air at high temperature of 700 to 950° C.; and
cooling, ballmilling, and sifting the again calcinated material to obtain the compound of lithium transition metal oxide, $Li\,Ni_{1-x-y}Co_xMn_yO_2$.

19. The method of claim 18 wherein the $Me^{n+}$ derives from at least one of the compounds from the following groups of materials: sulfates, nitrates, chlorides, acetates, other water soluble inorganic salts, and, other water soluble salts of organic acid.

20. The method of claim 18 wherein the $CO_3^{2-}$ ion concentration of the second solution is 0.1 to 3.0 mol/l.

* * * * *